T. R. SINCLAIRE.
Car Starter.
No. 56,810.
Patented July 31, 1866.
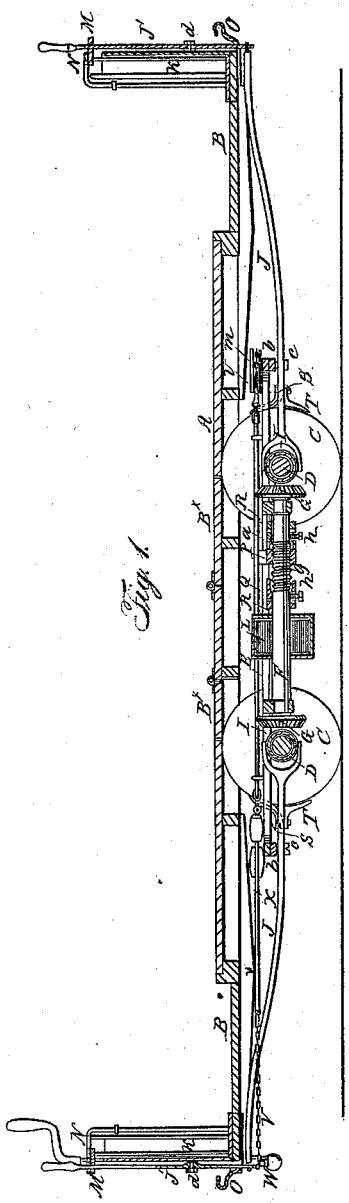
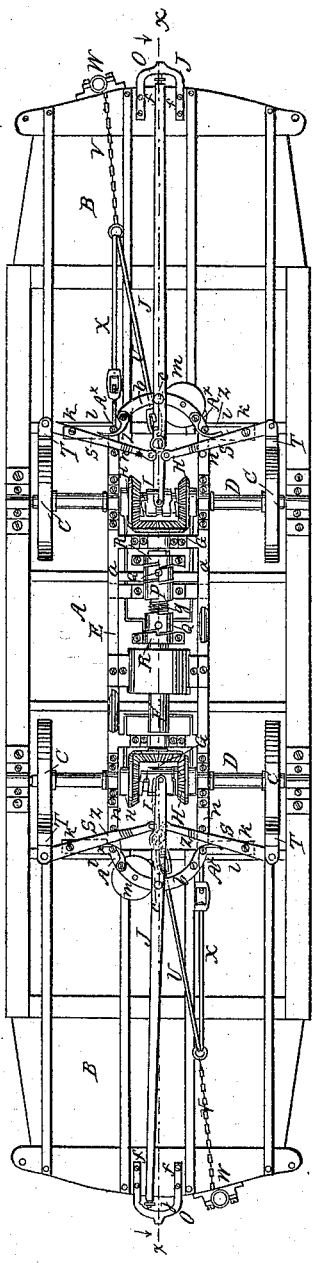
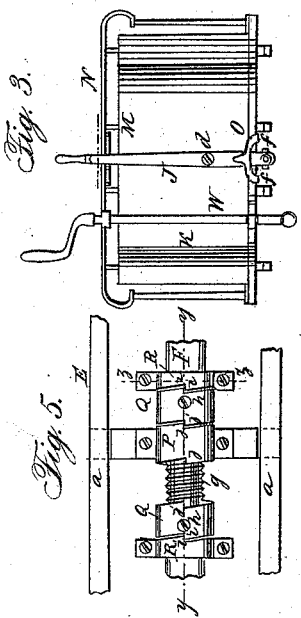
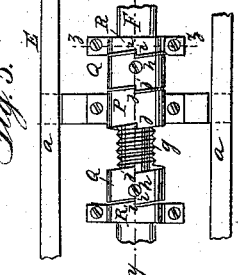
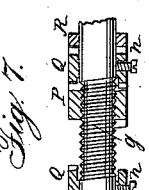
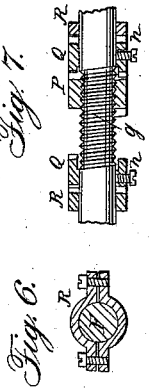
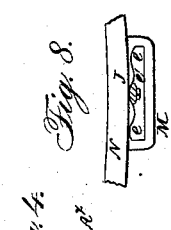
Witnesses:
Inventor:

UNITED STATES PATENT OFFICE.

THOMAS R. SINCLAIRE, OF NEW YORK, N. Y.

IMPROVED CAR STARTER AND BRAKE.

Specification forming part of Letters Patent No. 56,810, dated July 31, 1866.

*To all whom it may concern:*

Be it known that I, THOMAS R. SINCLAIRE, of the city, county, and State of New York, have invented a new and Improved Car Starter and Brake; and I do hereby declare that the following is a full, clear, and exact description thereof, which will enable others skilled in the art to make and use the same, reference being had to the accompanying drawings, forming part of this specification, in which—

Figure 1 is a side sectional view of my invention taken in the line $x\,x$, Fig. 2; Fig. 2, an inverted plan of the same; Fig. 3, an end view of the same; Figs. 4, 5, 6, 7, and 8, views of enlarged detached sections pertaining to the same, Fig. 7 being a section of Fig. 5 taken in the line $y\,y$, and Fig. 6 a section of Fig. 5 taken in the line $z\,z$.

Similar letters of reference indicate like parts.

This invention relates to a new and improved car-starting and car-brake mechanism, designed for horse or street cars or other wheel-vehicles, and has for its object the relieving of the team in starting a car by husbanding or storing up the momentum, impetus, or power used in stopping or retarding the motion of the same, and utilizing said power in starting or urging the team up to the usual speed.

The invention consists in carrying out to a further degree of perfection certain parts for the same object patented by me December 19, 1865, and reissued March 27, 1866.

A represents the bottom of the body of a horse or street car; B B, the platforms attached thereto as usual; C, the wheels, and D the axles. These parts may all be constructed in the ordinary way, and therefore do not require a special description.

E is a frame fitted loosely on the axles D, and composed of two parallel bars, $a\,a$, connected by semicircular or arched bars $b\,b$ at their ends, as shown in Fig. 2. In this frame E there is placed, centrally and longitudinally, a shaft, F, having a bevel-wheel, G, on each end of it.

On each axle D there are placed loosely two bevel-wheels, H, which gear into the wheels G on the shaft F, and either of the wheels H may be connected with its axle D by means of a clutch, I, actuated through the medium of two levers, J J', one of which, J, has its fulcrum-pin $c$ passing through the centers of the semicircular bar or arch $b$, a clutch and its levers being, of course, at each end of the car. The outer ends of the levers J are fitted in the lower ends of the levers J', the latter having their fulcrum-pins $d$ passing through the aprons K at the outer ends of the platforms. (See Figs. 1 and 3.)

It will be seen from the above description that by moving the levers J' the clutches I may be connected with either wheel H on the axles D, and one wheel H, when thus clutched and connected with its axle, is turned with it, so as to communicate motion to shaft F and wind up a coil-spring, L, thereon, which spring serves as a brake to retard or stop entirely the motion of the car, and also serves as a power in starting the same when the said wheel H, which is clutched to the axle, and which wound up the spring, is released from the axle by the movement of the levers J J', and the other wheel H, on the same axle, is connected with the latter.

The winding up of the spring L and the application of its power to the wheels C and axles D are accomplished by substantially the same mechanism as that described in my previous Letters Patent. There is a novelty, however, in the means for operating the clutches I.

The levers J' are elastic, or are constructed so as to have a certain degree of elasticity, and they pass through guides or metal loops M, attached to the top rails, N, of the aprons K, said loops having each three recesses, $e\,e\,e'$, made in them at one side, in any of which the levers J' are held or retained by their own elasticity, (see Fig. 8,) the levers being thus prevented from casually moving, but still allowed to be readily operated by the driver. When the levers J' are in the central recess, $e'$, the clutches I are free from both wheels H on the axles, and when the levers J' are in either of the recesses $e\,e$ the clutches I are connected with one or the other of the wheels H. Hence it will be seen that the driver, at either end of the car, can cause the spring to be wound up and its power applied to the car to assist in starting the same without any difficulty whatever, and without the liability of committing any error or mistake in the manipulation of the lever J'.

O represents draft-hooks secured one to each end of the car. The team is attached to these hooks, and they are made in the form of a fork, or with two branches, $f f$, as shown in Fig. 2, to admit of the levers J' passing up through them. By this arrangement the draft-hooks cannot interfere with the operation of the levers J'.

There is another important feature connected with the stopping and starting mechanism, and that is the limiting of the winding up of the spring L on the shaft F and the unwinding of the same in order to preserve the spring or prevent it from breaking under undue tension and sudden stopping and starting, and also to control the number of revolutions required of the shaft F to wind up the spring, and also for the purpose of varying the power of the spring by winding it up a greater or less number of turns on shaft F, and holding or retaining it thus wound up. This is effected by having a screw, $g$, cut on the shaft F, and a nut, P, fitted thereon, said nut being arranged as a slide to work between the bars $a\ a$ of the frame E. On the shaft F there are secured by set-screws $h$ two collars, Q Q, which limit the movement of the nut P, and consequently that of the rotation of shaft F, in either direction, so that the spring L may be retained in a partially-wound state on shaft F, and be prevented from wholly unwinding in expending its power to start the car. This greatly relieves the spring, preventing it from breaking or being strained under undue tension or by any sudden action when in an unwound or fully wound-up state.

The collars Q Q are connected with clamps R R, (see Fig. 6,) firmly bolted on the shaft F, and these clamps and the collars Q Q are provided with teeth $i$, (see more particularly Fig. 5,) to form locks and prevent the collars from turning on the shaft F, a contingency which might occur if dependence were placed on the set-screws $h$ alone. The nut P is also provided with similar teeth, $j$, one at each end, to engage with corresponding teeth $j'$ on the collars Q Q, so that the nut may lock with the collars and, in stopping the rotation of shaft F, be prevented from binding against the collars or having the screw $g$ bind in the nut.

I would remark that the teeth of the collars and nut may be provided with india-rubber, leather, or other flexible or elastic substance, to prevent concussions when the teeth of said parts come in contact.

S represents shoe or brake levers, attached by fulcrum-pins $k$ to arms $l$, which project from the bars $a\ a$ of the frame E, at or near the junction of the semicircular bars $b$ therewith. These shoe-levers have shoes T attached to their outer ends, which bear against the treads of the wheels C when the brakes are applied or the levers S actuated to effect that purpose.

There are two levers, S, at each end of the frame E, one at each side, and the inner ends of each pair of levers are connected to a rod, U, and attached to chains V, which are connected to the lower ends of vertical shafts W at the outer sides of the aprons K of the platforms. Each chain V has a rod, X, attached to it, and these rods extend along above the frame E, one at each side of the same, and they have chains Y attached, which pass around pulleys $m\ m$ on the semicircular bars $b\ b$, and are connected to the inner ends of the levers S. By this arrangement it will be seen that all the shoes T will be applied to the wheels C by the turning of either shaft W, and that the power is directly applied to the shoe-levers and the shoes applied to the wheels by a very limited movement of the shafts W, a half-turn of the latter being amply sufficient for the purpose.

The shoes T are kept free from the treads of the wheels C by means of springs Z, attached to the semicircular bars $b$, and bearing against the levers S, between their inner ends and the fulcrum-pins $k$, as shown in Fig. 2, pins $n$ being attached to the semicircular bars $b$ or the bars $a$, limiting the movement of the levers S under the action of the springs Z. Each spring Z has an eccentric, A*, bearing against it, said eccentrics being fitted in the bars $b$, and by turning them the springs Z may be made to bear against the levers S with a greater or less pressure, as circumstances may require. An enlarged view of an eccentric is shown in Fig. 4.

In order to facilitate the lubricating of the mechanism herein shown and described I have doors B* made in the bottom of the car, by opening which all the parts requiring lubrication are rendered accessible.

Having thus described my invention, I claim as new and desire to secure by Letters Patent—

1. The employment or use of the collars Q Q, one or more, placed on the shaft F, in combination with the nut P, and the screw $g$ on shaft F, substantially as and for the purpose set forth.

2. The clamps R R, with or without the teeth $i\ j\ j'$, one or more, in combination with the collars Q Q and nut P, all placed on shaft F, and arranged substantially as and for the purpose specified.

3. The arched bars $b\ b$, in combination with the frame E, shoe or brake levers S, and arm $l$, all arranged in the manner and for the purpose specified.

4. The pivots $c$, in combination with the levers J and arched bars $b$, substantially as and for the purposes stated.

5. The shoe-levers S, applied to the frame E, as shown, and provided with springs Z, and stops or pins $n$, substantially as and for the purpose set forth.

6. The eccentrics A*, applied to the springs

Z, for the purpose of graduating their pressure, as described.

7. The operating of the shoe-levers S from the shafts W by means of the chains V, rods U X, chains Y, and pulleys $m$ $m$, all arranged to operate substantially in the manner as and for the purpose specified.

8. An elastic lever, J', in combination with the lever J, substantially as and for the purpose set forth.

9. In combination with the levers J J', the draft-hooks O, constructed in the form of a fork, or branched to admit of the levers J' passing through them, as described.

THOS. R. SINCLAIRE.

Witnesses:
   WM. F. MCNAMARA,
   ALEX. F. ROBERTS.